United States Patent Office 2,780,641
Patented Feb. 5, 1957

2,780,641

AMINOACID SALTS OF DIETHYLAMINOETHYL 4-AMINO-2-BROMOBENZOATE

Laszlo Reiner, Essex Fells, N. J.

No Drawing. Application May 21, 1954,
Serial No. 431,575

4 Claims. (Cl. 260—472)

This invention relates to salts of diethylaminoethyl 4-amino-2-bromobenzoate, said ester having the formula

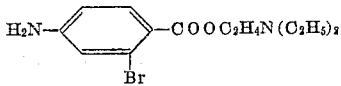

The invention is directed more particularly to new salts of the aforesaid ester.

The hydrochloride of diethylaminoethyl 4-amino-2-bromobenzoate (Freijka & Vitha, Pub. faculte sci. univ. Masaryk No. 48, 1–22 (1925); Chemical Abstracts [19] 2332) was found to possess useful local anesthetic properties. Thereafter the hydrogen halides of other esters of 4-amino-2-bromobenzoic acid were reported as having good local anaesthetic properties and relatively low toxicity (Moore & Volwiler, J. A. C. S. [62] 2299 (1940)). However, none of those compounds are used for local anaesthesia.

I have discovered that novel salts of diethylaminoethyl ester of 4-amino-2-bromobenzoic acid possess adequately high solubility in water and local anesthetic properties. As a consequence of such properties they are characterized by marked utility rendering them useful for local anaesthesia. Solutions of these novel salts, in clinically effective concentrations, can be stored at temperatures close to the freezing point without crystallization of the salts.

In general, the acids used for the preparation of these novel salts are relatively low molecular weight organic amino substituted dicarboxylic acids.

Salts of the amino acids having a zwitterion and in addition another acidic group are prepared by adding, to the aqueous solution of the amino acid, the equivalent amount of the base dissolved in alcohol or any suitable organic solvent such as dioxane, and concentrating the solution under reduced pressure. Then, an equal volume of a solvent such as methanol, ethanol, acetone or other suitable solvent, is added. The desired salt crystallizes on standing. The base can also be added in the form of a solution thereof in a low boiling solvent that is not miscible with water as for example benzene, diethyl ether, isopropyl ether, etc. After such intermixture, the solvent and part of the water are subsequently evaporated; and the salts crystallized from the aqueous solution or after the addition of ethanol.

Salts of acidic amino acids, that is, amino acids which in addition to the —$NH_3^+$ and —$COO^-$ groups, also possess another acidic group such as is the case in aspartic, glutamic and cysteic acids, are not very soluble at their isoelectric point but show a satisfactory solubility at nearly neutral or slightly alkaline hydrogen ion concentrations, that is, at pH values of 6 to 7 or slightly higher. At ph values of 8 or more the insoluble base is precipitated. Increased solubility is afforded at a pH range at which the compound is in part present in the anionic form, as for example, in the case of the glutamate:

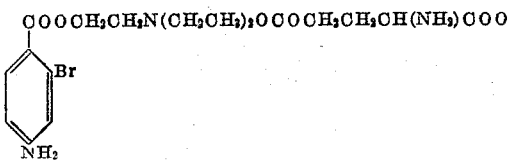

The possibility of regulating the solubility by changing the pH value of the medium used as a solvent is only one of the advantages of these acid amino acid salts of diethylaminoethyl 4-amino-2-bromobenzoate. Another advantage is that some of them are physiologic anions (such as glutamate and aspartate) which are known to be important metabolites of nervous tissue. Further advantages are the favorable local anesthetic properties of the compounds such as rapid action, good penetration and somewhat prolonged action.

The following are examples of the invention:

EXAMPLE 1

*Diethylaminoethyl 4-amino-2-bromobenzoate glutamate*

3.1 grams of diethylaminoethyl 4-amino-2-bromobenzoate is dissolved in 30 cc. of warm ethanol and 1.5 gram of glutamic acid in 90 cc. of water, is added. The solution is concentrated in vacuo to 10 cc., then enough ethanol is added to produce slight turbidity and the mixture is allowed to crystallize in the cold. The suspension is filtered, the precipitate washed with absolute ethanol, then with ether and dried. The salt of this example has a melting point of 174° to 176° C.

EXAMPLE 2

*Diethylaminoethyl 4-amino-2-bromobenzoate aspartate*

This salt was prepared in accordance with the general procedure described in Example 1 except that the glutamic was replaced by aspartic acid.

EXAMPLE 3

*Diethylaminoethyl 4-amino-2-bromobenzoate cysteate*

This salt was prepared in accordance with the general procedure described in Example 1 except that cysteic acid (α-amino-β-sulfo propanoic acid,

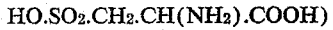

was used in the stead of the glutamic acid.

It will be further understood that the foregoing description of the invention and the examples set forth are merely illustrative of the principles thereof. Accordingly, the appended claims are to be construed as defining the invention within the full spirit and scope thereof.

I claim:

1. Salts of diethylaminoethyl-4-amino-2-bromobenzoate and aliphatic acids selected from the class of aliphatic aminodicarboxylic and aminosulfocarboxylic acids.
2. Diethylaminoethyl 4-amino-2 bromobenzoate glutamate.
3. Diethylaminoethyl 4-amino-2 bromobenzoate aspartate.
4. Diethylaminoethyl 4 - amino - 2 bromobenzoate cysteate.

References Cited in the file of this patent

FOREIGN PATENTS 321,968    Great Britain _____ Nov. 25, 1929